Figure 1:
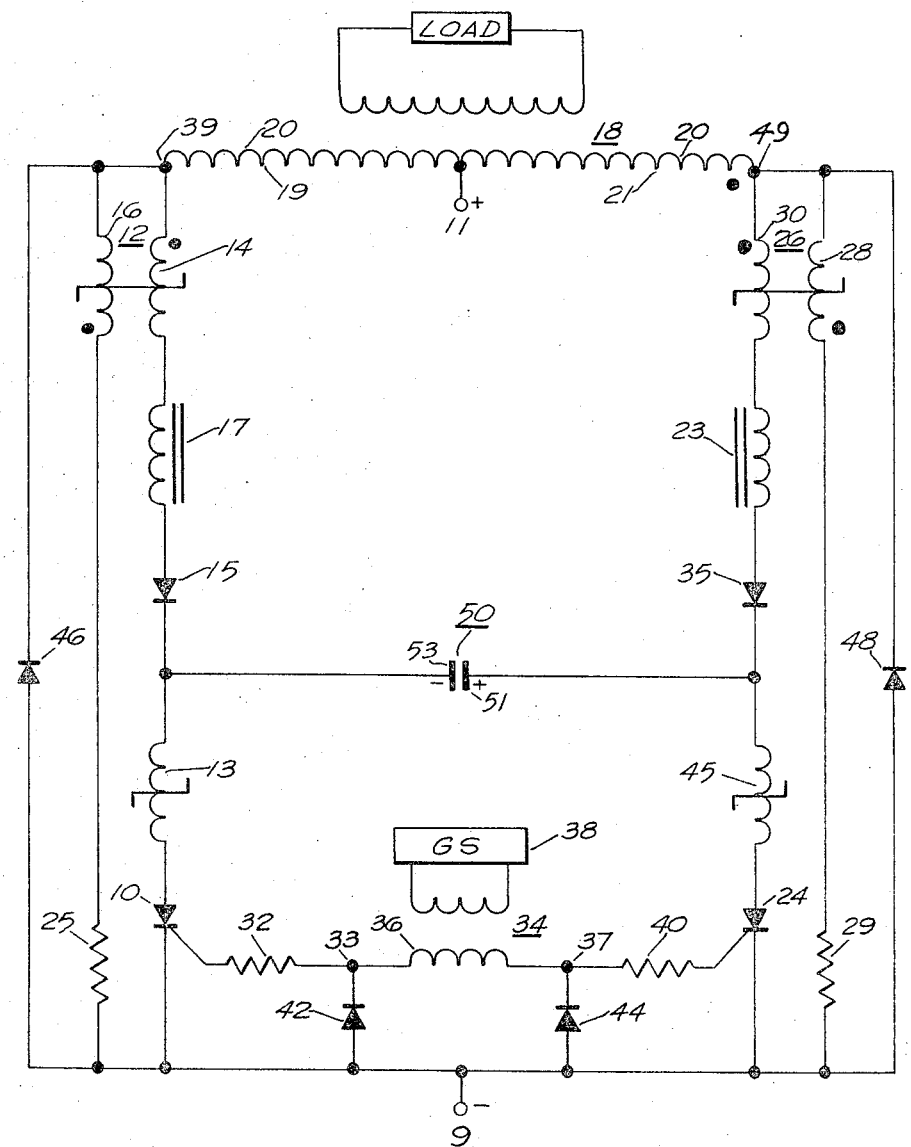

United States Patent Office 3,300,706
Patented Jan. 24, 1967

3,300,706
PROTECTION ARRANGEMENT
Armistead L. Wellford, Waynesboro, Va., assignor to General Electric Company, a corporation of New York
Filed Dec. 6, 1962, Ser. No. 242,829
10 Claims. (Cl. 321—43)

This invention relates to gate controlled rectifier circuits. More particularly, it relates to means for protecting gate controlled rectifiers in high voltage applications from the deleterious effects of excessive reverse current during commutation into nonconductivity and of excessive forward current at gating into conductivity.

In comparatively high voltage gate controlled rectifier circuits such as static inverters of the type wherein commutation into nonconductivity is effected by the automatic connection of a charged capacitor across a conducting gate controlled rectifier with only this gate controlled rectifier in series wtih the capacitor, i.e., no lumped inductance is included in the series combination (so-called "hard commutation"), the reverse current surge through the gate controlled rectifier during such commutation may cause serious damage thereto. By "high voltage," there is contemplated an input D.C. voltage to be switched which exceeds 100 volts.

For example, in the parallel type gate controlled rectifier inverter, a commutating capacitor is connected across a pair of parallel arranged switching gate controlled rectifiers. In the operation of such inverter, when a first of the gate controlled rectifiers is conducting, the commutating capacitor is charged in a polarity such that its side adjacent the conducting gate controlled rectifier becomes its minus terminal. Thereafter, upon the gating of the other and nonconducting gate controlled rectifier into conductivity, a very low impedance discharge path for the commutating capacitor is provided in the reverse direction through the first gate controlled rectifier. If this reverse current through the first gate controlled rectifier is not limited, it can be seriously damaged by the reverse current surge therethrough. However, this reverse current must be permitted to flow in order to achieve rapid turn-off of the first gate controlled rectifier. The duration and magnitude of the reverse current flow is a function of the first gate controlled rectifier's forward current "history" (magnitude and duration) during its conductive period and of the circuit impedance as well as the inherent characteristics of the gate controlled rectifier. A current surge having about a ten ampere peak and a duration of about one to two microseconds is typical and in low voltage applications, for example, about 30 volts D.C. nominal, there is comparatively little danger of exceeding the acceptable reverse current limits, the normal distributed inductance presented by the circuit wiring generally being sufficient to limit reverse current buildup. The aforesaid factors, of course, obtain in the commutation interval when the other gate controlled rectifier is "turned-off."

However, where voltage inputs of 100 volts D.C. and greater are handled by the inverter, reverse currents at commutation greatly exceed acceptable limits. In these situations, a lumped inductance cannot be inserted in series relationship with the commutating capacitor since such inductance would resonate therewith and, consequently, drastically alter the commutation scheme and thereby increase the voltage seen on the gate controlled rectifiers by a factor of two. Thus, if the lumped inductance were added in the circuit, each parallel leg of the inverter, to permit safe operation, might require a series arrangement of a plurality of gate controlled rectifiers.

It has also been found in the aforesaid high voltage applications, that upon the gating of a gate controlled rectifier into conductivity, the anode current at such gating builds up too rapidly prior to an acceptable drop in the anode to cathode voltage. The great amount of power being handled coupled with such anode current concentration effect can also cause a gate controlled rectifier to fail.

Accordingly, it is an important object of this invention to provide means in a circuit comprising gate controlled rectifiers which undergo gating into conductivity and commutation into nonconductivity during the operation of the circuit for protecting these gate controlled rectifiers from excessive forward anode currents at the times of their gating into conductivity and from excessive reverse currents during the intervals of their commutation into nonconductivity.

It is a specific object of the invention to provide means in a static inverter comprising gate controlled rectifiers as the switching devices therein for protecting these gate controlled rectifiers from excessive forward anode currents at the times of their gating into conductivity and from excessive reverse currents during the intervals of their commutation into nonconductivity.

It is another specific object to provide protecting means in accordance with the preceding object which does not affect the commutation scheme of the inverter.

Generally speaking and in accordance with the invention, there is provided in a circuit which includes therein gate controlled rectifying means which undergoes gating into conductivity and commutation into nonconductivity during the normal operation of the current saturable magnetic means serially connected in the current path of said gate controlled rectifying means to minimize forward current therethrough when it is gated into conductivity and to minimize reverse current therethrough when it is commutated into nonconductivity.

Also, in accordance with the invention, there is provided in a static inverter comprising a plurality of gate controlled rectifiers adapted to be connected to a unidirectional potential source as the switching elements therein and including commutating means in circuit with the gate controlled rectifiers, a small saturable magnetic device connected in the circuit paths of the commutating means and each of the gate controlled rectifiers.

The novel features, which are believed to be characteristic of this invention are set forth with particularity in the appended claims. The invention itself, however, both as to organization and method or operation, together with further objects and advantages thereof, may best be understood by reference to the following description when taken in connection with the accompanying drawings.

Figure 2:
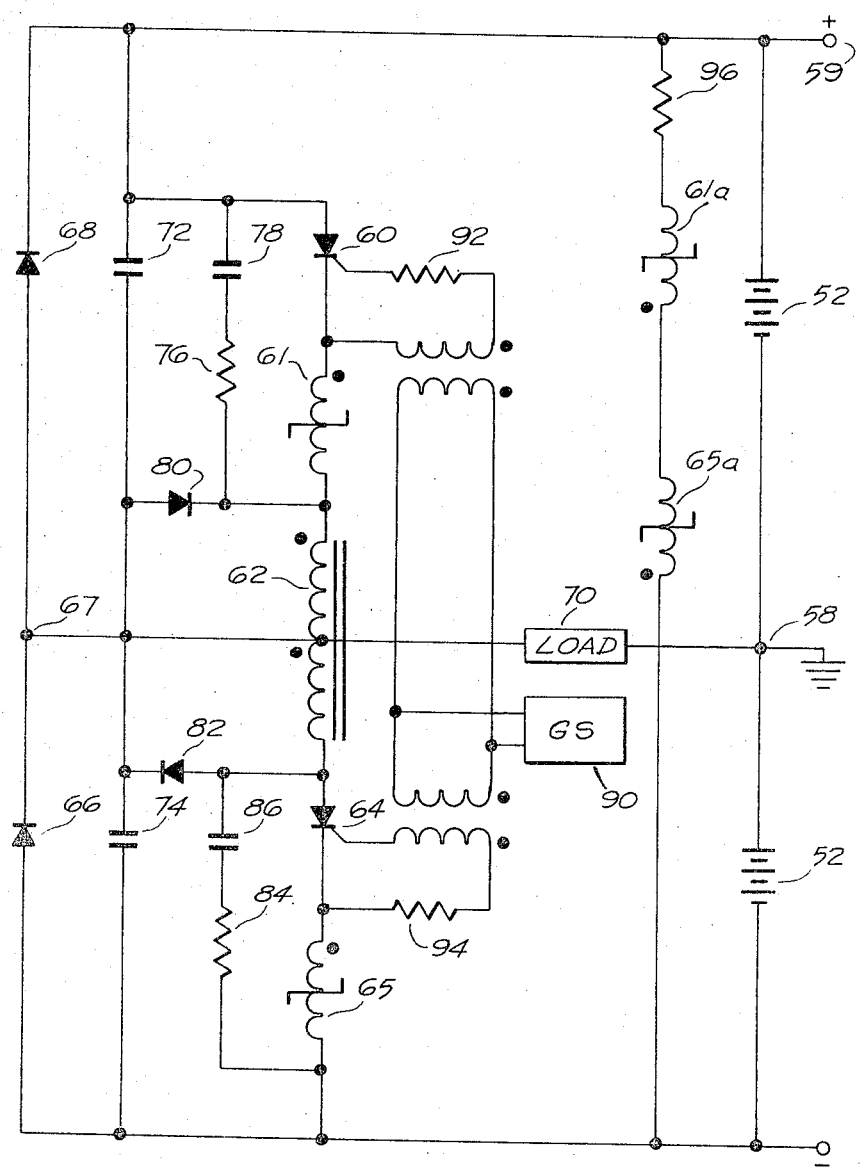

In the drawings, FIG. 1 is a schematic depiction of a first illustrative embodiment of the protecting means constructed in accordance with the principles of the invention and utilizable in a parallel type static inverter; and FIG. 2 is a schematic drawing of a second embodiment of the aforesaid protecting means as utilized in a series type static inverter.

The directing conception of this invention is the prevention of excessive reverse current through a circuit connected gate controlled rectifier during its commutation into nonconductivity and excessive current build up therethrough when it is initially gated into conductivity. Such prevention is effected by the use of a "softening," i.e., small saturable reactor serially connected in the current path of the gate controlled rectifiers. Conceptually, the invention may be described as a series arrangement of the cathode to anode path of a gate controlled rectifier, a softening saturable reactor and a transient impedance load, there being applied to such series arrangement, the output of a low transient impedance alternating current potential or unidirectional potential source. The circuit is so arranged that the softening reactor at the time that the gate controlled rectifier changes state presents an unsaturated core to current flow whereby at a change of state, only exciting current flows in the gate controlled rectifier until the core of the softening reactor saturates. Means, if necessary, are included in the circuit to insure that the core of the softening reactor presents such unsaturated to current flow at the respective moments of such changes of state. The prinpicles of the invention, accordingly, may be applied in gate controlled rectifier static inverter circuits, voltage regulator circuits, static switches, generator control circuits, etc., i.e., all phase controlled gate controlled rectifier circuits in which operation requires the gating into conductivity and commutating into nonconductivity of gate controlled rectifiers.

Referring now to FIG. 1 wherein there is shown a specific embodiment of the invention, i.e., "center-tap" (or "parallel") type inverter circuit, a first silicon controlled rectifier 10 or PNPN junction type gate controlled semiconductor rectifying device has its anode connected to the positive terminal 11 of a D.C. power source (not shown) through a first and comparatively small saturable reactor 13, saturable reactor 13 suitably comprising a small torodial core having less than 10 turns therearound, the cathode to anode path of a diode 15, an inductor 17, the low resistance winding 14 of a second and comparatively large saturable reactor 12 and half 19 of the primary winding 20 of a center-tapped output transformer 18.

Similarly, a second silicon controlled rectifier 24 has its anode connected to positive terminal 11 through a saturable reactor 45 which is similar to saturable reactor 13, the cathode to anode path of a diode 35, an inductor 23, the low resistance winding 30 of a saturable reactor 26 which is similar to saturable reactor 12 and the other half 21 of primary winding 20. The cathodes of silicon controlled rectifiers 10 and 24 are directly connected to the negative terminal 9 of the D.C. source.

Connected between the respective gate electrodes of silicon controlled rectifiers 10 and 24 is the series arrangement of a current limiting resistor 32, the secondary winding 36 of a transformer 34 across which there is developed the output of a gating source 38 which may suitably be a magnetic coupled multivibrator, and a current limiting resistor 40. For controlling the voltage applied to the gate electrodes of the silicon controlled rectifiers, the anode to cathode path of a first diode 42 is interposed between negative terminal 9 and the junction 33 of resistor 32 and winding 36 and the anode to cathode path of a second diode 44 is interposed between negative terminal 9 and the junction 37 of winding 36 and resistor 40.

Provided between the negative terminal 9 and the junction 39 of primary winding half 19 and reactor winding 14 is the anode to cathode path of a "pump-back" diode 46 and provided between negative terminal 9 and the junction 49 of primary winding half 21 and reactor winding 30 is the anode to cathode path of a "pumpback" diode 48. A commutating capacitor 50 is connected between the cathodes of diodes 15 and 35. A reset current path for saturable reactor 12 is provided by the series arrangement of a low power winding 16 thereof and a resistor 25 connected between junction 39 and negative terminal 9. A reset current path for saturable reactor 26 is provided by the series arrangement of low power winding 28 and a resistor 29 connected between junction 49 and negative terminal 9.

Saturable reactors 12 and 26 are also suitably fairly small reactors although they may be larger than saturable reactors 13 and 45. The characteristics of reactors 12 and 26 may be chosen such that in a reactor, the product of the turns of the low resistance winding such as winding 14 of reactor 12, the core area and the core saturation flux density enables the core of the reactor to go from "negative" to "positive" saturation during the brief commutation interval, and the configuration of the reactor may be chosen such that its "after-saturation" inductance is of a suitable value to form a series tuned LC circuit for commutating capacitor 50. To provide reactors which have the aforesaid characteristics, the windings of reactors 12 and 26 can be wound around two cores instead of the usual single core, one core being of a square hysteresis loop type material to produce the desired turns-area-flux density product and the second core suitably consisting of a material such as powdered permalloy to enable the providing of the desired after-saturation inductance. Instead of utilizing such double core reactors to insure proper after-saturation inductance, linear inductors such as inductors 17 and 23 may be included in the circuit.

The operation of the circuit of FIG. 1 is considered first as if the small saturable reactors 13 and 45 were not included therein. In considering such operation, let it be assumed that silicon controlled rectifier 10 is gated into conductivity by a pulse from gating source 38. Due to "autotransformer action," i.e., the transformer action between the two halves of primary winding 20, essentially twice the voltage from the D.C. source is established across primary winding 20 with the positive terminal being at the designating polarity dot terminal of the winding. Also, capacitor 50, in this situation charges to twice the voltage from the D.C. source with the polarity shown as in FIG. 1. This polarity condition of primary winding 20 causes saturable reactor 26 to be reset as shown by the designating polarity dot on winding 28 by reset current flowing from junction 49 to negative terminal 9 through winding 28 and resistor 29. In this connection, it is to be understood that the polarity dot designation on a saturable reactor indicates the direction of current flow therethrough required to produce positive ampere turns therein.

When silicon controlled rectifier 24 is gated into conductivity by the next half cycle of output from gating source 38, the gating voltage is removed from silicon controlled rectifier 10 and commutating capacitor 50 effectively is connected directly across silicon controlled rectifier 10 in a polarity such as to apply a reverse voltage to silicon controlled rectifier 10 and to by-pass the load current. Capacitor 50 resonates with the after-saturation inductance of winding 14 of saturable reactor 12 or with inductor 17, the natural frequency of this series LC combination controlling the duration of time for silicon controlled rectifier 10 to be reverse-biased (commutation time). The current associated with this resonant discharge flows out of side 51 of capacitor 50 through silicon controlled rectifier 24 (saturable reactor 45 is assumed to be absent), pumpback diode 46, winding 14, inductor 17, diode 15 and back to side 53 of capacitor 50. This resonant effect tends to maintain the commutation time fixed for variations of the inverter load from zero load to rated load. Hence, the LC circuit is designed to provide reverse voltage for a period sufficiently long to enable silicon controlled rectifier 10 to regain its full blocking state. The value of capacitor 50 need only be large enough to enable the supplying of load current during the short commutation interval and does not have to be of a large enough value to compensate for a lagging reactive load current.

It is to be noted that the energy stored in capacitor 50 and not needed to supply the load during the resonant discharge of the commutation interval is returned to capacitor 50 during such resonant discharge. This discharge current pulse does not flow through the windings of output transformer 18 or back to the D.C. power supply. Also, since the flux direction in the core of saturable reactor 26 is proceeding from negative to positive saturation, winding 30 of saturable reactor 26 presents a relatively high impedance during the commutation interval. This action effectively decouples the commutating current from output transformer 18 and the D.C. power supply during the commutation interval. Immediately following the commutation interval, reactor 26 saturates and silicon controlled rectifier 24 conducts load current during the next half cycle. Capacitor 50 is consequently charged with side 53 positive and side 51 negative and reactor 12 is reset to prepare for the next commutation pulse.

It has been found in the circuit of FIG. 1 that there may exist a "ferro-resonant" oscillation in the LC circuits formed by commutation capacitor 50 and the after-saturation inductance of saturable reactors 12 and 26. A "ferro-resonant" oscillation occurs in an LC circuit when a non-linear reactor, i.e., one having saturable core is utilized. In this type of circuit, when the core of the reactor saturates, it abruptly goes from a "high impedance" to a "low impedance" state and rapidly transfers its energy to the capacitor. Accordingly, in such "ferro-resonant" oscillation, capacitor 50 actually may "overcharge" to more than twice the value of the D.C. power source.

To suppress this "ferro-resonant" oscillation, diodes 15 and 35 are included. These diodes effectively function as clamps to provide the required damping effect.

The circuit of FIG. 1 may be designated as a "hard" commutation circuit. "Hard commutation" may be defined as commutation in which a charged capacitor is connected across a conducting silicon controlled rectifier during a commutation interval with only the silicon controlled rectifier in series with the capacitor, no lumped inductance being interposed betwen the capacitor and the silicon controlled rectifier. In FIG. 1, it is seen that in the absence of saturable reactors 13 and 45, capacitor 50 is directly connected across silicon controlled rectifiers 10 and 24. Thus, if it is assumed in this situation that silicon controlled rectifier 10 has been conducting and that capacitor 50 is charged to the polarity shown in FIG. 1, the gating of silicon controlled rectifier 24 into conductivity provides a very low impedance discharge path for capacitor 50 backward through silicon controlled rectifier 10. Unless this reverse current is limited, silicon controlled rectifier 10 can be damaged by this reverse current surge and silicon controlled rectifier 24 could be likewise damaged on the other half cycle of output from the inverter. However, such reverse current must be permitted to flow in order to achieve fast turn-off of the conducting silicon controlled rectifier. The duration and magnitude of the reverse current flow is a function of the silicon controlled rectifiers forward current history (time of conductivity and amount of current therethrough) and of the circuit impedance as well as the characteristics of a silicon controlled rectifier. Typically, a surge of current having about a 10 ampere peak and a duration of one to two microseconds is desirable. In low voltage applications such as 30 volts D.C. nominal circuits, for example, there is little danger of exceeding the allowable reverse current limit as normal wiring inductance is sufficient to provide a limit to the current buildup.

The foregoing is not true at high voltages, i.e., those in the 100 plus volt D.C. range inputs. To prevent such damage by inserting an inductance in series with the capacitor 50 is not practical since such insertion would drastically change the commutating scheme because the inductance would resonate with capacitor 50 thereby increasing the voltage seen on the silicon controlled rectifiers 10 and 24 by a factor of two. Obviously, the latter result is most undesirable in high voltage D.C. circuits and might necessitate the series arrangement of pluralities of silicon controlled rectifiers in each parallel arm of the inverter to enable the handling of such high voltages.

Small saturable reactors 13 and 45 solve the problem of excessive reverse current surge and the possible deleterious effects resulting therefrom through the silicon controlled rectifiers during commutation intervals.

Thus, considering the operation now of the circuit of FIG. 1 with saturable reactors 13 and 45 in the circuit, if it is assumed that silicon controlled rectifier 10 is conducting, then saturable reactor 13 is saturated with respect to forward current through silicon controlled rectifier 10. When silicon controlled rectifier 24 is gated into conductivity, reverse current for silicon controlled rectifier 10 encounters the unsaturated saturable reactor 13 and only exciting current flows in the commutation circuit. It is to be noted that it does not matter whether saturable reactor 45 is in the desired saturation state during this commutation interval. However, at the time that silicon controlled rectifier 10 is again gated into conductivity when its conduction half cycle is initiated by the next half cycle of output from gating source 38, reverse current from discharging capacitor 50 will again encounter an unsaturated saturable reactor 45.

In inverters handling the aforesaid high D.C. voltages, the exciting current through the small saturable reactors during their commutation intervals are comparatively high due to the very high rates of change of flux direction therein. By varying the selection of the core and the number of turns thereon, the exciting current through reactors 13 and 45 can be adjusted to a desired level, such adjustment lending an additional degree of freedom in the design of the inverter. Accordingly, since "hard" commutating circuits are being considered, reactors 13 and 45 may suitably be designated as "softening" reactors.

The foregoing has shown how saturable reactors 13 and 45 in the circuit of FIG. 1 function to limit the peak reverse current through silicon controlled rectifiers 10 and 24 at commutation.

In the circuit of FIG. 2, it is shown how such softening reactors are also advantageously utilized in limiting the forward current buildup through the silicon controlled rectifiers. In this connection, it has been found that silicon controlled rectifier anode current at gating time is building up prior to the desired fall of the anode to cathode voltage therein. The high wattage handled by the silicon controlled rectifier coupled with a current concentration effect may cause the silicon controlled rectifier to fail. The circuit of FIG. 2 eliminates this problem of excessively rapid forward current buildup.

Referring now to FIG. 2, there is shown connected across the D.C. supply source 52, a series arrangement of the anode to catode path of a first silicon controlled rectifier 60, a "softening," i.e., small saturable reactor 61 such as reactors 13 and 45 of the circuit of FIG. 1, an inductor 62, the anode to cathode path of a silicon controlled rectifier 64 and a saturable reactor 65 similar to saturable reactor 61. Also, connected across D.C. supply source 52 is the series arrangement of the cathode to anode paths of pumpback diodes 68 and 66 which permit the return of energy to the D.C. source in conditions such as those of lagging power factor loads, i.e., inductive loads, when circulating reactive currents are present. Inductor 62 is center-tapped and the junction 67 of diodes 66 and 68 and the center point of inductor 62 is connected to the circuit load 70.

Connected in shunt with the series arrangement of silicon controlled rectifier 60 and saturable reactor 61 is the series arrangement of a capacitor 78 and a resistor 76 and also connected in shunt therewith is the series arrangement of a capacitor 72 and the anode to cathode path of a diode 80 as shown, diode 80 having its anode to cathode path connected between point 67 and the junction of reactor 61 and inductor 62. Effectively, diode 80 is connected across the "upper" half of inductor 62.

Similarly, the respective series arrangements of a capacitor 86 and a resistor 84 and the anode to cathode path of a diode 82 and a capacitor 74 are both connected in shunt with the series arrangement of silicon controlled rectifier 64 and saturable reactor 65. Similar to diode 62, diode 82 has its anode to cathode path connected between inductor 62 and point 67 whereby it is connected across the lower half of inductor 62.

The gating source 90 which may suitably be a magnetic coupled multivibrator provides gating pulses to the gate electrodes of silicon controlled rectifiers 60 and 64 through its output transformer, the series arrangement of a current limiting resistor 92 and a secondary winding of the gating source output transformer being connected between the cathode and gate electrodes of silicon controlled rectifier 60 and the series arrangement of another secondary winding of the gating source transformer and a current limiting resistor 94 being connected between the cathode of gate electrode of silicon controlled rectifier 64. It is seen from the polarity dot designations on the secondary windings of the gating source transformer that silicon controlled rectifiers 60 and 64 are gated into conductivity at successive half cycles of output from the gating source.

The operation of the circuit of FIG. 2 is first considered as if saturable reactors 61 and 65 were not included therein. In such operation, if it were assumed that silicon controlled rectifier 60 is gated into conductivity by the half cycle of output from source 90, load current flows from the positive terminal of D.C. source 52, silicon controlled rectifier 60, the upper half of inductor 62 and load 70 to center tap 58. During the half cycle that silicon controlled rectifier 60 is conductive, side 67 of commutating capacitor 74 charges substantially to the value of the potential of positive terminal 59. At the end of the half cycle of operation, silicon controlled rectifier 64 is gated into conductivity and gating current is simultaneously removed from silicon controlled rectifier 61. At the instant that silicon controlled rectifier 64 is rendered conductive, the full voltage across capacitor 74 appears across the "lower" half of inductor 62 thus forcing the voltage across this lower half to be instantaneously substantially equal to the D.C. supply voltage. Because of autotransformer action between the upper and lower halves of center-tapped inductor 62, practically instantaneously, the voltage across the entire winding of inductor 62 is equal to substantially twice the D.C. supply voltage. Consequently, the anode to cathode voltage across silicon controlled rectifier 60 is reversed and silicon controlled rectifier 60 is commutated into nonconductivity.

Now, on the succeeding half cycle, i.e., when silicon controlled rectifier 64 conducts, capacitor 72 charges similarly, and when silicon controlled rectifier 60 thereafter is again gated into conductivity, the same commutation events ensue as when silicon controlled rectifier 64 was rendered conductive at the beginning of the immediately preceding half cycle. Of course, during the half cycle that silicon controlled rectifier 64 conducts, capacitor 74 becomes discharged and during the half cycle that silicon controlled rectifier 60 conducts, capacitor 72 becomes discharged.

Pumpback diodes 66 and 68 enable the return of energy from the load circuit to the D.C. supply which is necessary to enable the inverter to carry reactive loads. Diodes 80 and 82 are connected across commutating inductor 62 in order to clamp the voltage across the inductor and thereby prevent any voltage overshoot which might otherwise require the use of higher voltage rated diodes and higher voltage rated silicon controlled rectifiers in the circuit. The respective series arrangements of resistor 76 and capacitor 78 and resistor 84 and capacitor 86 are connected across silicon controlled rectifiers 60 and 64 in order to absorb any energy in the small leakage inductance of inductor 62 after rectifier reverse current has suddenly ceased flowing.

As has been stated above, and still assuming the absence of saturable reactors 61 and 65 in the circuit of FIG. 2, it has been found that when a silicon controlled rectifier is gated into conductivity, anode current has been building up to an unacceptable amount prior to the desired fall of the anode to cathode voltage of the silicon controlled rectifier.

Now considering the operation of the circuit of FIG. 2 with the presence of softening saturable reactors 61 and 65 therein, when silicon controlled rectifier 60 is gated into conductivity, the current therethrough immediately following such gating is merely the exciting current for the reactor. Thereafter, when the voltage across silicon controlled rectifier 60 has fallen to an acceptable value, saturable reactor 61 saturates and permits load current to be passed. The same events ensue, of course, when silicon controlled rectifier 64 is gated into conductivity.

Saturable reactors 61 and 65 in the circuit of FIG. 2 also function to limit the reverse current peaks therein as they do in the circuit of FIG. 1. Thus, if forward current is present in the silicon controlled rectifier just prior to its being rendered nonconductive which is, of course, necessary if reverse current is to flow, this reverse current encounters a completely "reset," i.e., unsaturated saturable reactor. If a sharp pulse of reverse voltage were to be applied across the series arrangement of the silicon controlled rectifier and the saturable reactor in the reverse direction, the saturable reactor would effectively block such current and thereby limit it to the exciting current of the core of the saturable reactor.

In both of the circuits of FIGS. 1 and 2, no external reset is necessary to provide limiting of the reverse silicon controlled rectifier current as the cores of the softening saturable reactors are reset by the forward current which flows through a silicon controlled rectifier prior to its being gated into nonconductivity. After commutation, however, the cores of saturable reactors 61 and 65 in FIG. 2 have to be reset so that they present respective unsaturated cores for forward silicon controlled rectifier current. Such resetting is readily accomplished by the series arrangement connected across source 52 of a resistor 96 and saturable reactor reset windings 61a and 65a, windings 61a and 65a being wound around the same cores as windings 61 and 65 respectively.

The problem presented by undesired current buildup at the instant of a gating of a silicon controlled rectifier does not exist to any significant extent where the input D.C. voltages to be switched are comparatively low. However, the severity of the problem increases rapidly with an increase in the input voltage being switched. Certainly, when inverters are handling D.C. voltages upwards of 100 volts, the problem is quite pressing. The distributed inductances of the circuit apparently do not prevent these fast current buildups and even the interwinding capacitance of a commutating inductor may be sufficient to allow undesired current buildup. Actually, the series arrangements of capacitor 78 and resistor 76 and capacitor 86 and resistor 84 connected across silicon controlled rectifiers 60 and 64 respectively serve as "de-spikers." For such de-spikers to be effective, the components thereof have to have very low inductance. This, of course, means that in the type of circuit of FIG. 2 with the de-spikers included therein, in any event, there is very little inductance in the circuit which functions to prevent rapid current buildup.

While there have been shown particular embodiments of this invention, it will, of course, be understood that it is not intended to be limited thereto since many modifications both in the circuit arrangements and in the instrumentalities employed therein may be made and it is, therefore, contemplated in the appended claims to cover any such modification as fall within the true spirit and scope of the invention.

What is claimed as new and desired to be secured by Letters Patent of the United States is:

1. In a circuit which includes therein a PNPN junction type semiconductor gate controlled rectifying device which undergoes gating into conductivity under control of an applied gating signal and commutation into nonconductivity under control of a charged commutating capacitor which causes reverse current to flow through said rectifying device to achieve rapid turn-off of conduction of said rectifying device during the normal operation of said circuit, saturable magnetic means serially connected in the current path of said gate controlled rectifying device to control forward current buildup therethrough when it is initially gated into conductivity and to control reverse current buildup therethrough when it is commutated into nonconductivity.

2. In a circuit as defined in claim 1 wherein said magnetic means is a small saturable reactor which is non-resonant with said capacitor.

3. In a static inverter which comprises as the switching elements therein a plurality of PNPN junction type semiconductor gate controlled rectifying means adapted to be connected in parallel arrangement across a unidirectional potential source and including commutation means connected between said gate controlled rectifying means, a respective saturable magnetic device serially connected in the circuit path comprising said commutating means and each of said gate controlled rectifying means for limiting forward currents to a predetermined magnitude for a given time through each gate controlled rectifying means at the time that it is gated into conductivity and for limiting reverse currents flowing through each gate controlled rectifying means to achieve rapid turn-off of conduction of said rectifying means to a predetermined magnitude for a given time when it is commutated into nonconductivity.

4. In a static inverter as defined in claim 3 wherein said commutating means comprises a capacitor and said magnetic devices are respective small saturable reactors.

5. In a static inverter which comprises as the switching elements therein a series arrangement of a plurality of gate controlled PNPN junction type semiconductor rectifying means adapted to be connected across a unidirectional potential source and including commutating means in circuit with said gate controlled rectifying means, means to protect said rectifying means against undesirable current buildup comprising a respective saturable magnetic device serially connected in each of the circuit paths comprising said commutating means and a gate controlled rectifying means for saturating and thereby controlling forward current buildup through said rectifying means when it is gated into conductivity and for saturating and thereby controlling reverse current buildup through said rectifying means to achieve rapid turn-off of conduction of said rectifying means without damaging said rectifying means when it is commutated into nonconductivity.

6. In a static inverter as defined in claim 5 wherein said commutating means includes a center tapped inductor connected between said gate controlled rectifying means and wherein said magnetic devices are saturable reactors.

7. An inverter circuit comprising a pair of input terminals and a center-tapped output circuit, means for connecting one of said input terminals to the center-tap of said output circuit, a control rectifier means serially connected from the other of said input terminals to each of the respective outer ends of said center-tapped output circuit, gating means for selectively gating each of said control rectifier means into conductivity, and non-resonant impedance commutating means for commutating each of said control rectifier means into nonconductivity, and a saturable magnetic means serially connected with each said control rectifier means between said other of said input terminals and the respective outer ends of said center-tapped output circuit to minimize current though a respective control rectifier means when said control rectifier means is initially gated into conductivity and to minimize reverse current flowing through a respective control rectifier means to achieve rapid turn-off of conduction of said rectifying means when said control rectifier means is gated into nonconductivity.

8. In an inverter circuit as defined in claim 7 wherein said center tapped output circuit comprises a center tapped inductive winding.

9. In an inverter circuit as defined in claim 7 wherein said saturable magnetic means is a saturable reactor.

10. In an inverter circuit as defined in claim 7 wherein said commutating means comprises a capacitor cross coupling said control rectifier means connected to the respective outer ends of said center tapped output circuit.

References Cited by the Examiner

UNITED STATES PATENTS

| | | | |
|---|---|---|---|
| 3,082,369 | 3/1963 | Landis | 321—45 |
| 3,103,616 | 9/1963 | Cole et al. | 321—45 |
| 3,120,633 | 2/1964 | Genuit. | |
| 3,124,740 | 3/1964 | Corey et al. | 321—45 |
| 3,128,440 | 4/1964 | Davis. | |
| 3,213,352 | 10/1965 | Faith. | |
| 3,221,187 | 11/1965 | Clifton | 307—88.5 |

JOHN F. COUCH, *Primary Examiner.*

LLOYD McCOLLUM, *Examiner.*

W. SHOOP, *Assistant Examiner.*